United States Patent
Williams

(10) Patent No.: US 7,252,676 B1
(45) Date of Patent: Aug. 7, 2007

(54) MEDICATING NURSING NIPPLE

(76) Inventor: Lillie Williams, 819 Hadden Ave., Camden, NJ (US) 08103

( * ) Notice: Subject to any disclaimer, the term of this patent is extended or adjusted under 35 U.S.C. 154(b) by 47 days.

(21) Appl. No.: 11/141,149

(22) Filed: May 31, 2005

Related U.S. Application Data

(60) Provisional application No. 60/662,045, filed on Mar. 15, 2005.

(51) Int. Cl.
*A61J 17/00* (2006.01)
*A61J 9/00* (2006.01)
*A61J 11/00* (2006.01)

(52) U.S. Cl. .................. 606/234; 606/236; 604/77; 215/6; 215/11.1

(58) Field of Classification Search ........... 215/11.1, 215/11.4, 6, DIG. 8; 604/77; 606/234, 236
See application file for complete search history.

(56) References Cited

U.S. PATENT DOCUMENTS

| | | | | |
|---|---|---|---|---|
| 2,836,321 A | * | 5/1958 | Soltesz et al. | 215/11.1 |
| 3,077,279 A | | 2/1963 | Mitchell | |
| 4,488,551 A | * | 12/1984 | Connelly | 606/236 |
| 4,915,242 A | * | 4/1990 | Marte | 215/11.1 |
| 5,129,532 A | * | 7/1992 | Martin | 215/11.1 |
| 5,176,705 A | * | 1/1993 | Noble | 604/77 |
| 5,383,906 A | * | 1/1995 | Burchett et al. | 606/236 |
| 5,620,462 A | * | 4/1997 | Valenti | 606/234 |
| 5,728,137 A | * | 3/1998 | Anderson-Fignon | 606/234 |
| 5,897,007 A | * | 4/1999 | Schein et al. | 215/11.1 |
| 6,126,679 A | | 10/2000 | Botts | |
| 6,270,519 B1 | | 8/2001 | Botts | |
| 2004/0055987 A1 | * | 3/2004 | Paige | 215/11.1 |
| 2005/0040054 A1 | * | 2/2005 | Peterson | 206/219 |

* cited by examiner

*Primary Examiner*—Sue A. Weaver

(57) ABSTRACT

An apparatus for adding medicine to a standard baby bottle nipple. The apparatus comprises a nipple that has side measurements to allow a caretaker to place a volume of liquid medicine within the nipple. Then, the medicine can be capped off with a stopper and the nipple attached to a standard baby bottle with milk or formula mixture within it. The stopper does have a small hole to allow the milk or formula to enter the nipple, where it will be consumed with the liquid medicine mixture. However, due to the small nature of the hole in the stopper, the medicine will be consumed in large part before the infant or toddler even begins to consume the milk or formula mixture.

3 Claims, 2 Drawing Sheets

MEDICATING NURSING NIPPLE

I. CROSS-REFERENCE TO RELATED APPLICATIONS

This application claims the benefit of U.S. Provisional Application No. 60/662,045, filed Mar. 15, 2005.

II. BACKGROUND OF THE INVENTION

The present invention concerns that of a new and improved apparatus for adding medicine to a standard baby bottle nipple.

III. DESCRIPTION OF THE PRIOR ART

U.S. Pat. No. 6,270,519, issued to Botts, discloses a nipple for use in dispensing both medicine and liquid to an infant.

U.S. Pat. No. 6,126,679, issued to Botts, discloses a nipple for use in dispensing both medicine and liquid to an infant.

U.S. Pat. No. 3,077,279, issued to Mitchell, discloses an infants feeding device having a nipple marked with gradations of measurements for dispensing medicine.

IV. SUMMARY OF THE INVENTION

The present invention concerns that of a new and improved apparatus for adding medicine to a standard baby bottle nipple. The apparatus comprises a nipple that has side measurements to allow a caretaker to place a volume of liquid medicine within the nipple. Then, the medicine can be capped off with a stopper and the nipple attached to a standard baby bottle with milk or formula mixture within it. The stopper does have a small hole to allow the milk or formula to enter the nipple, where it will be consumed with the liquid medicine mixture. However, due to the small nature of the hole in the stopper, the medicine will be consumed in large part before the infant or toddler even begins to consume the milk or formula mixture.

There has thus been outlined, rather broadly, the more important features of a baby bottle nipple that the detailed description thereof that follows may be better understood and in order that the present contribution to the art may be better appreciated. There are, of course, additional features of the baby bottle nipple that will be described hereinafter and which will form the subject matter of the claims appended hereto.

In this respect, before explaining at least one embodiment of the baby bottle nipple in detail, it is to be understood that the baby bottle nipple is not limited in its application to the details of construction and to the arrangements of the components set forth in the following description or illustrated in the drawings. The baby bottle nipple is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present baby bottle nipple. It is important, therefore, that the claims be regarded as including such equivalent constructions insofar as they do not depart from the spirit and scope of the present invention.

It is therefore an object of the present invention to provide a baby bottle nipple which has all of the advantages of the prior art and none of the disadvantages.

It is another object of the present invention to provide a baby bottle nipple which may be easily and efficiently manufactured and marketed.

It is another object of the present invention to provide a baby bottle nipple which is of durable and reliable construction.

It is yet another object of the present invention to provide a baby bottle nipple which is economically affordable and available for relevant market segment of the purchasing public.

Other objects, features and advantages of the present invention will become more readily apparent from the following detailed description of the preferred embodiment when considered with the attached drawings and appended claims.

V. BRIEF DESCRIPTION OF THE DRAWINGS

VI. DESCRIPTION OF THE PREFERRED EMBODIMENT

Figure 1:
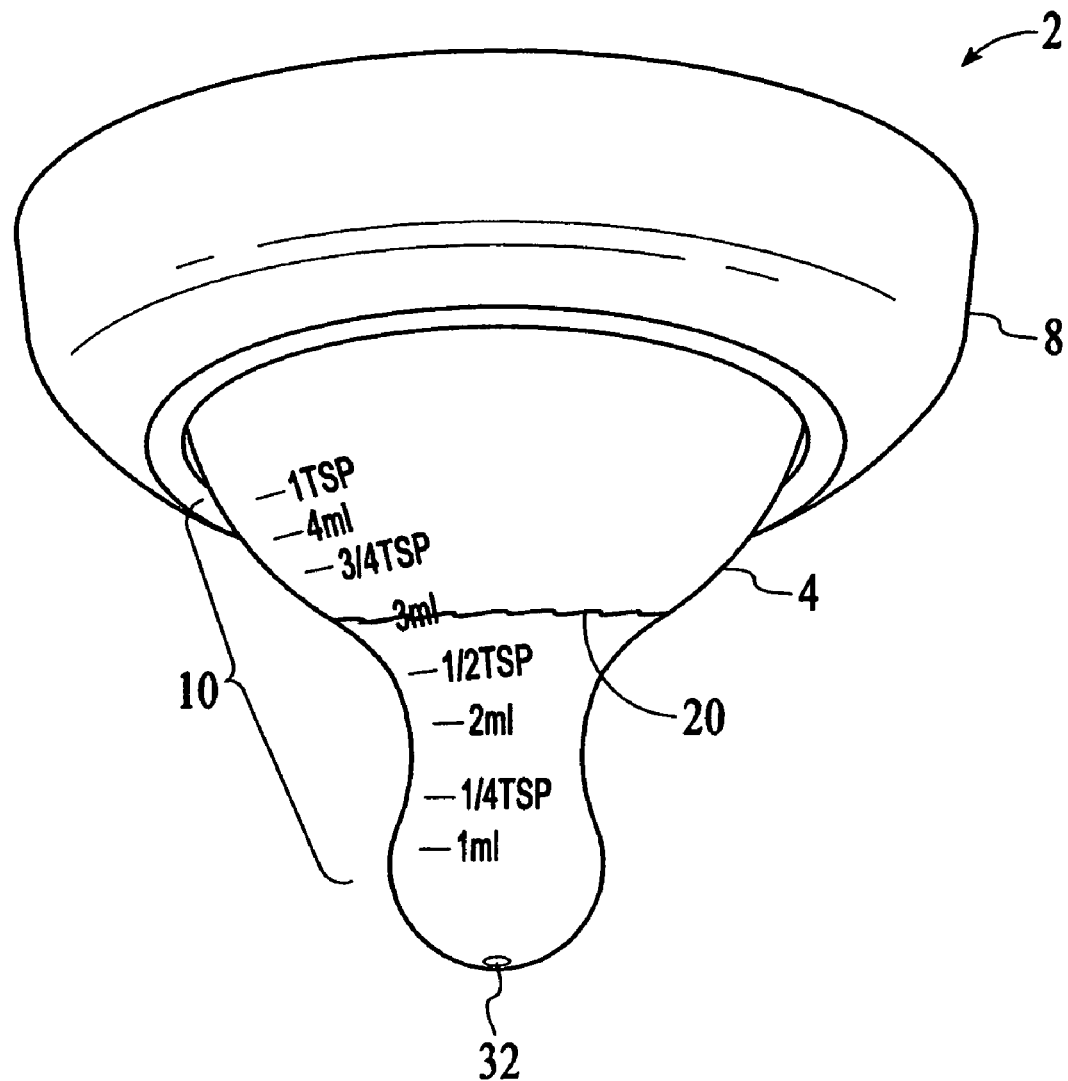
FIG. 1 shows a perspective view of the apparatus as it would appear in a disassembled state.
Figure 2:
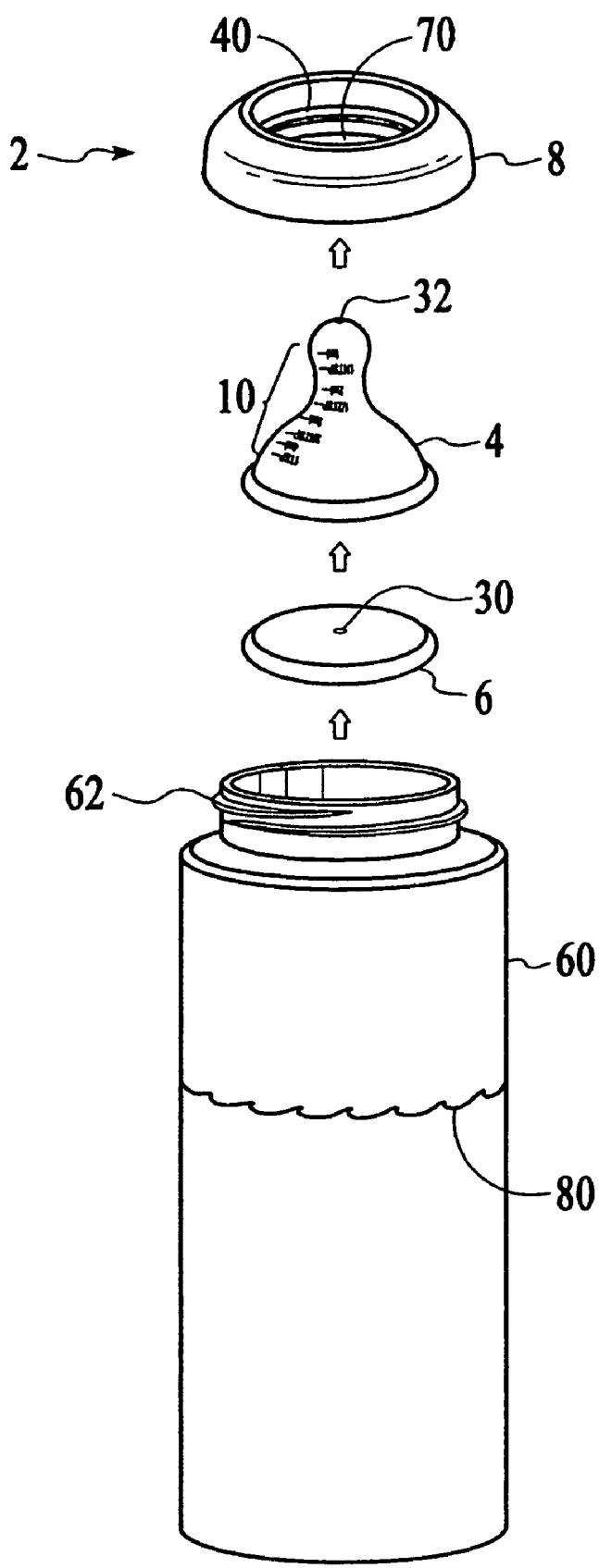
FIG. 2 shows a perspective view of the apparatus as it would appear in an assembled state.

FIG. 1 shows a perspective view of the apparatus 2 as it would appear in a disassembled state, while FIG. 2 shows a perspective view of the apparatus 2 as it would appear in an assembled state. Apparatus 2 is designed to provide a "disguise" to infants and toddlers by placing medicine in a nipple 4 that is attached to a standard baby bottle 60.

Apparatus 2 comprises a nipple 4, a stopper 6, and a connector ring 8. Nipple 4 has two ends, an open end and a suckling end, and is preferably fabricated from a non-toxic, pliable plastic that is hypoallergenic. The nipple 4 has two surfaces, an inner surface and an outer surface, and is hollow.

On the outer surface of the nipple 4 is located a plurality of markings 10 which are designed to measure from the suckling end upward. The markings 10 are viewed as being "right side up" when the suckling end is facing downward and the open end is facing upward. The markings utilize common measurements that are used for dispensing medicine, such as milliliters and teaspoons. As can be seen in FIG. 2, several measurements showing milliliters and teaspoons are shown. The markings shown are not meant to be limiting in either quantity or amounts, and are shown merely as one possible representation of the many different possible combination of measurements that could be present.

Once a quantity of liquid medicine 20 has been placed within the nipple 4, then the stopper 6 can be attached to the open end of the nipple 4. The stopper 8 will keep the medicine within the actual nipple portion of the present invention and not mix it with the milk or formula mixture that might be in the actual bottle 60. The stopper 8 does have a small central hole 30, however, that will allow milk or formula to pass through into the nipple 4 before it gets drunk out of the suckling end of the nipple 4 through hole 32.

Connector ring 8 has two surfaces, an inner surface and an outer surface. The inner surface of connector ring 8 has a plurality of internal threads 40, allowing the inner surface of the connector ring 8 to be threadably attached to the bottle 60, which has a plurality of external rings 62. The central hole 70 located in the connector ring 8 has a smaller diameter than that of the width of the nipple 4 near the open end of the nipple 4, thereby allowing placement of the nipple 4 before the connector ring 8 is attached to a bottle 60.

To properly use the present invention, an individual would first place a volume of liquid medicine within the nipple 4 and then attached the stopper 6. Next, the individual would insert the suckling end of the nipple 4 through the hole 70 in the connector ring 8, at which time, the connector ring 8 can be attached to a bottle 60 with a volume of formula or milk 80 in it. Once an infant or toddler starts to drink from the nipple 4, initially the infant or toddler will be drinking mostly the medicine, although some milk or formula 80 will be entering the nipple through the small central hole 30. Eventually all the medicine within the nipple 4 will be consumed, thereby allowing the infant or toddler to consume the rest of the milk or formula within the bottle 60. Alternatively, once this occurs, the caretaker could open up the present invention, remove the stopper 6, and then put the invention back together again (minus the stopper), thereby allowing a more free flow for the milk or formula mixture.

I claim:

1. A medicinal dispenser for infants and toddlers comprising:
    a nipple having an open end, a suckling end, an inner surface, and an outer surface, the nipple being hollow,
    a plurality of markings on the outer surface of the nipple, the marking being viewed as "right side up" when the open end of the nipple is facing upward,
    an amount of liquid medicine placed within the nipple,
    a flat stopper plate attached to the open end of the nipple,
    a central hole located in the plate stopper,
    a connector ring having an inner surface and an outer surface,
    a bottle,
    means for attaching the connector ring to the bottle,
    a central hole located in the connector ring,
    a volume of formula or milk placed within the bottle,
    wherein upon inserting the suckling end of the nipple through the hole in the connector ring and upon attachment of the connector ring to the bottle, the infant or toddler will drink the amount of liquid medicine placed within the nipple prior to drinking the formula or milk within the bottle.

2. A medicinal dispenser for infants and toddlers according to claim 1 wherein the means for attaching the connector ring to the bottle further comprises:
    a plurality of internal threads located on the inner surface of the connector ring,
    a plurality of external threads located on the bottle,
    wherein the plurality of internal threads located on the inner surface of the connector ring are threadably attached to the plurality of external threads located on the bottle.

3. A medicinal dispenser for infants and toddlers according to claim 1 wherein the plurality of markings on the outer surface of the nipple further comprises:
    a plurality of measurements using the metric system, and
    a plurality of measurements using the English measuring system.

* * * * *